United States Patent [19]
Dumont

[11] 4,081,616
[45] Mar. 28, 1978

[54] METHOD OF AND APPARATUS FOR ELIMINATING THE SIDE TONE OF A TELEPHONE STATION

[75] Inventor: Alain G. Dumont, Montceau-les-Mines, France

[73] Assignee: Jeumont-Schneider, Puteaux, France

[21] Appl. No.: 694,344

[22] Filed: Jun. 9, 1976

[30] Foreign Application Priority Data

Jun. 11, 1975   France ................................ 75 18182

[51] Int. Cl.² ............................................ H04M 1/58
[52] U.S. Cl. ................................ 179/81 A; 179/170.2
[58] Field of Search ............ 179/1 CN, 18 BC, 81 A, 179/170 NC, 170 T, 170.2, 170.8, 15 AA, 15 AT

[56] References Cited

U.S. PATENT DOCUMENTS

| | | | |
|---|---|---|---|
| 3,287,499 | 11/1966 | Brightman | 179/18 BC |
| 3,319,005 | 5/1967 | Gaunt | 179/18 BC |
| 3,828,146 | 8/1974 | Lewis | 179/18 BC |

*Primary Examiner*—Kathleen H. Claffy
*Assistant Examiner*—Joseph A. Popek
*Attorney, Agent, or Firm*—Bacon & Thomas

[57] ABSTRACT

Method and apparatus for use in telephone exchanges, such as time division multiplex exchanges, for eliminating the side tone of a telephone station by interruption of a restored input signal to a hybrid circuit thereof. A sampled signal is provided to a storage means having an output signal. The storage means output signal is filtered for reconstruction prior to connection to a reception line on the four-wire side of a hybrid circuit. The restored signal is interrupted during moments wherein a transmission signal, output on the four-wire side of the hybrid circuit, is sampled.

10 Claims, 1 Drawing Figure

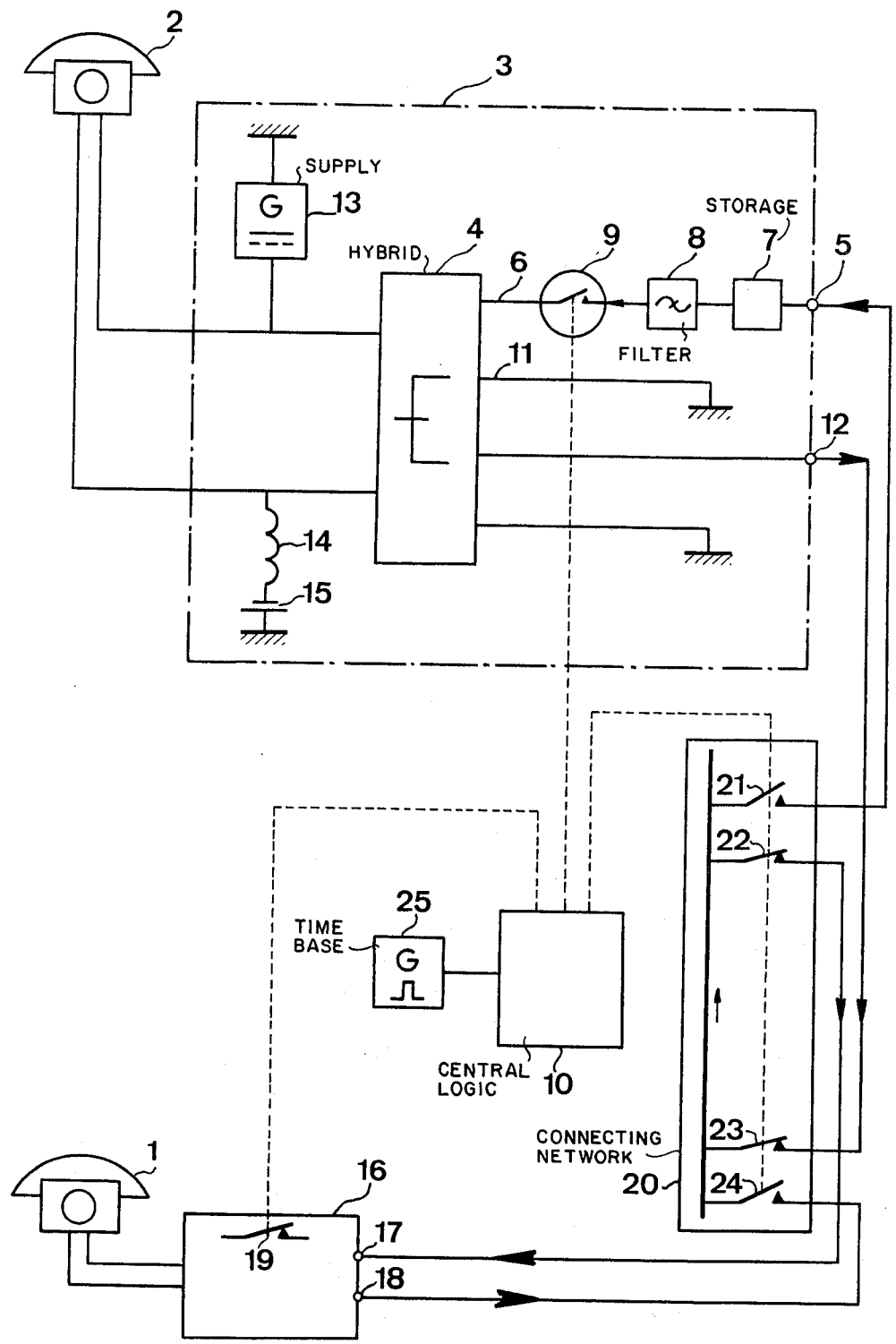

METHOD OF AND APPARATUS FOR ELIMINATING THE SIDE TONE OF A TELEPHONE STATION

BACKGROUND OF THE INVENTION

This invention relates, firstly, to a method of eliminating the side tone of a telephone station, more particularly in electronic time-division multiplex telephone exchanges. Secondly, it relates to apparatus for performing this method.

The known means of eliminating the side tone of a telephone station, i.e. in two-wire/four-wire change-over systems, are divided up into those using a telephone transformer and those in which the transmitted signals are separated from the received signals by using, for example, differential amplifiers to subtract the signal present at any given moment on the line and the received signals.

The disadvantage of these means is that they are bulky or expensive and they cannot operate independently of the frequency of the transmitting signals and of the impedance of the telephone line.

SUMMARY OF THE INVENTION

This invention obviates all these disadvantages but in practice it is applicable only to time switching telephone circuits, and more specifically that part of such circuit in which the voice signal received from a first subscriber has been restored by storage means and a filter in the equipment of a second subscriber.

The method according to the invention is characterised in that the voice signal at the output of the filter is interrupted in the equipment of the second subscriber only for the duration of the time slot for transmission to the first subscriber and during that same time the voice signal originating from the second subscriber is transmitted to the first subscriber.

The apparatus for performing the above method is characterised in that it comprises, in the equipment of each subscriber: a telephone line supply circuit comprising a constant d.c. supply connected between earth and one of the wires of the subscriber line, the other wire being connected to earth through an inductor in series with the central battery of the subscriber's equipment; a hybrid circuit, also known as a terminating set; an electronic switch connected in series with the non-earthed reception line of the terminating set, between the filter and the latter, and said switch being controlled by the central logic unit of the time division system so as to be in the closed position when the system transmission voice signal sampling switch is open, and vice versa.

BRIEF DESCRIPTION OF THE DRAWING

The invention will be more readily understood from one exemplified embodiment and the accompanying drawing, which illustrates the circuit diagram of a system associated with a time switching telephone circuit with pulse amplitude modulation, although the invention is equally applicable to other types of modulation, more particularly pulse code modulation.

DETAILED DESCRIPTION OF A PREFERRED EMBODIMENT

Referring to the single figure, the first and second subscribers are represented by their respective telephone sets 1 and 2. The telephone equipment of the second subscriber is shown inside a chain-dotted frame 3. This equipment comprises a hybrid circuit, or terminating set 4, the two-wire circuit of which is connected to the telephone set 2. The following elements are disposed in series consecutively between the input terminal 5 in equipment 3 of the non-earthed wire 6 of the reception line of the terminating set 4 on the four-wire side thereof, and the terminating set: A storage means 7 followed by a filter 8 in accordance with the known voice signal restoration principle, and finally an electronic switch 9 controlled by the central logic unit 10 of the time switching system of the telephone exchange.

A switch 9 of this type may, for example, comprise a field-effect transistor, whose grid is connected to the logic unit 10, the source and the drain forming the switch terminals.

The other wire 11 of the reception line on the four-wire side is earthed. The transmission line of the terminating set 4 has one of its wires connected to terminal 12 of the telephone equipment 3, while the other wire is earthed. The telephone line supply circuit on the two-wire side of the terminating set 4 comprises a constant d.c. supply 13 connected between earth and one of the two wires, the other wire being earthed through an inductor 14 in series with the central battery 15 of the equipment 3.

The first subscriber's equipment 16 is identical to the second subscriber's 3, i.e. it comprises more particularly a reception terminal 17 being the counterpart of terminal 5, a transmission terminal 18 which is the counterpart of terminal 12, and an electronic switch 19 identical to switch 9.

In the electronic telephone exchange connecting network 20 the circuit diagram shows only the reception vocal signal sampling switches 21 and 22, and the transmission vocal signal sampling switches 23 and 24 in order to avoid overloading the diagram, all the contacts of these switches being controlled by the logic unit 10, which in turn receives the pulses of the time base 25. The broken lines represent the various controls for the switches by the logic unit 10.

Taking the simple case of telephone communication between 1 and 2, the system according to the invention operates as follows:

We shall assume a 125 microsecond sampling period which is equivalent to a multiplex comprising 32 time slots of about 4 microseconds each.

It is known that in order to establish communication between 1 and 2, two separate time slots are used, one for the direction 1–2 and the other for the direction 2–1.

For the entire period of the time slot allocated by the logic unit 10 to the direction of conversation 2–1, i.e. about 4 microseconds, the previously closed switch 9 is opened while the previously open contacts of switches 22 and 23 are closed; this procedure is repeated every 125 microseconds, switch 19 being closed and the contacts of switches 21 and 24 being open for the entire period of this time slot.

Similarly, for the entire period of the other time slot allocated by the logic unit 10 to the conversation direction 1–2, previously closed switch 19 is open while the previously open contacts of switches 21 and 24 are closed; this procedure is repeated every 125 microseconds, switch 9 being closed and the contacts of switches 22 and 23 being open for the entire period of this other time slot.

In this way it is impossible for the voice signal transmitted by one of the two subscribers to appear on the reception circuit of the same subscriber.

The diagram in the single FIGURE shows only the state of the various contacts for the duration of the time slot corresponding to the direction of communication 2-1.

The cutting off of the received voice signal for the very short time of about 4 microseconds every 125 microseconds is not percepticle to the subscriber.

The system according to the invention is applicable to all electronic telephone exchanges.

I claim:

1. A method for eliminating side tones of a telephone station operating in a time-division sampling mode comprising the steps of:
   (a) receiving signal samples representing a message transmitted by a second station;
   (b) restoring the transmitted message from the received sampled signals, and
   (c) interrupting the restored signal at predetermined intervals, thereby removing side tones from said telephone station.

2. The method recited in claim 1 wherein said restoring step comprises the steps of:
   (a) storing said received signal and
   (b) filtering said stored signal.

3. The method recited in claim 2 wherein said time-division sampling comprises closing a circuit periodically in a transmission path of the telephone station under control of a logic unit, and
   wherein said interrupting step occurs simultaneously with said periodic closing of a circuit,
   whereby said telephone station is prevented from receiving its own transmission during said predetermined interval.

4. An apparatus for eliminating side-tones of a telephone station operating in a time-division sampled mode and receiving sampled signals transmitted by a second station, comprising:
   (a) means for restoring a received sampled signal, said restoring means having an output signal, and
   (b) switching means for receiving and periodically interrupting said restoring means output signal.

5. An apparatus as recited in claim 4 further comprising sampling means in a circuit receiving signals from said telephone station, said sampling means closing a transmission path from said station at predetermined intervals,
   wherein said switching means interrupts said restoring means output signal during said predetermined intervals,
   whereby said telephone station does not receive restored signals during intervals of sampled transmission.

6. An apparatus as recited in claim 5 further comprising a central logic means for controlling said switching means and said sampling means, said central logic means adapted to cause said switching means to interrupt said restoring means output signal and to cause said sampling means to close said transmission path concurrently with the interruption of said output signal by said switching means.

7. An apparatus as recited in claim 6 comprising a terminating set receiving said output signal of said restoring means through said switching means on a non-grounded reception line.

8. An apparatus as recited in claim 7 wherein said terminating set provides an output transmission line having a non-grounded wire thereof connected to said sampling means.

9. An apparatus as recited in claim 6 wherein said restoring means comprises:
   (a) storage means and
   (b) filter means connected to said storage means.

10. An apparatus as recited in claim 6 wherein said switching means comprises a field-effect transistor having a grid, and wherein said central logic means controls said grid for interrupting said output signal.

* * * * *